April 8, 1930.          J. H. COOPER          1,753,919
                         COTTON PICKER
                        Filed Nov. 5, 1927
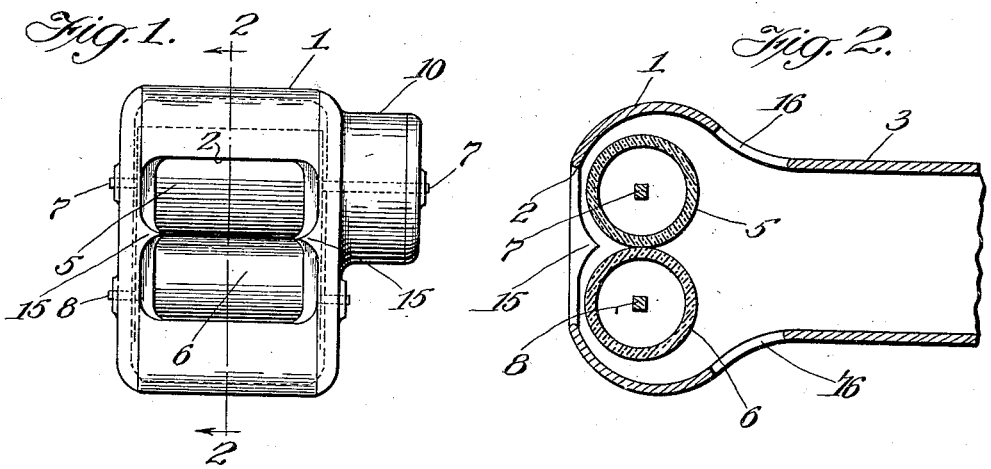
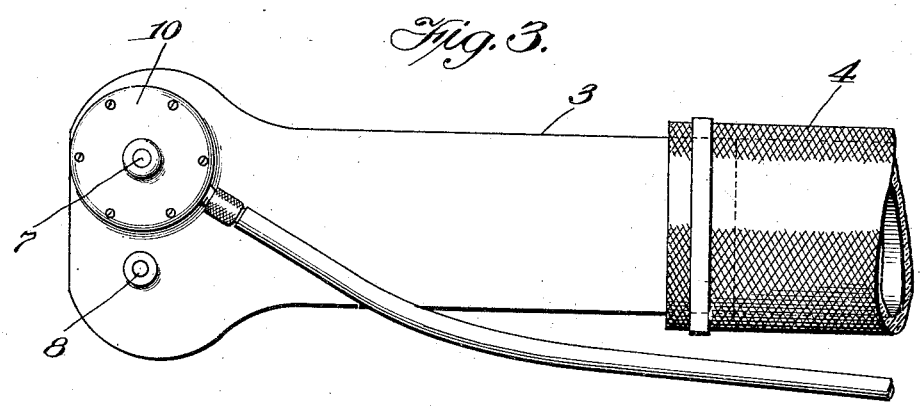
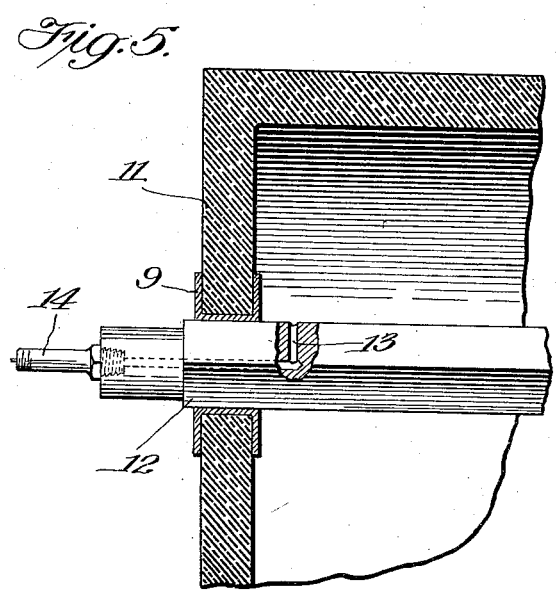
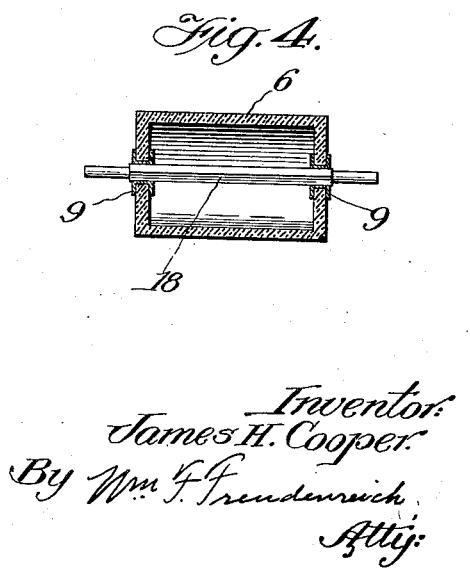
Inventor:
James H. Cooper.
By Wm. F. Freudenreich,
Atty.

Patented Apr. 8, 1930

1,753,919

UNITED STATES PATENT OFFICE

JAMES H. COOPER, OF CHICAGO, ILLINOIS

COTTON PICKER

Application filed November 5, 1927. Serial No. 231,207.

It has long been attempted to pick cotton by means of a flexible suction conduit having on the end a picker head provided with rapidly revolving cooperating members intended to draw the cotton from the boll and discharge it into the conduit. Rollers have been employed as the picker elements, but without success, for the reason that they either crush the seeds or spread apart to permit the passage of the seed, and therefore, also, the entrance of leaves and other foreign matter. Rotary brushes have been more successful, although it is difficult for the brushes to free themselves of the cotton. The usual brushes have a plurality of longitudinal rows of bristles spaced apart a distance less than the length of the lint associated with a seed, and therefore the lint is able to span the distance between consecutive rows of bristles, causing the lint to be wrapped on the brushes. Furthermore, any object engaged by the brushes and short enough or narrow enough to enter the space between two rows of bristles will stop the brushes and perhaps cause injury to the mechanism of the picker head.

The object of the present invention is to produce a simple and novel picker element which, when employed with a cooperating element in a picker head, will successfully draw the lint and the seed from the boll and deliver the same into the suction conduit or the like, without impairment in efficiency on account of the passage of cotton seed, without providing openings for the entrance of leaves or other objects, without permitting the lint to wind itself upon or adhere to the picker elements, and without stopping the operation of the mechanism or endangering its safety if a fairly large object is gripped between the picker elements.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a front elevation of a picker head in which my improved picker elements are incorporated; Fig. 2 is a section on line 2—2 of Fig. 1; Fig. 3 is a side view; Fig. 4 is a central longitudinal section through the lower picker element; and Fig. 5 is a central longitudinal section, on an enlarged scale, showing a fragment of a modified form of picker element.

Referring to the drawing, 1 represents a hollow head or casing of any usual or suitable construction, having in the front a large opening 2 and terminating at the rear in a tubular neck 3 adapted to be connected to the end of a suitable flexible or other conduit 4.

Extending transversely across the interior of the casing, just behind the opening 2, are two flexible resilient rollers 5 and 6. These rollers are preferably made of rubber soft enough to yield locally to permit the passage of a cotton seed while the rollers remain in contact with each other through the remainder of their lengths. The cylindrical exterior surfaces of the rollers are smooth, so that the lint will not adhere to them; and the circumferential length of each roller is greater than the length of the mass of lint associated with a cotton seed, so that the lint cannot wrap itself around the rollers. The rollers are preferably made in the form of hollow cylinders closed at the ends by heads made of rubber, as are the cylindrical shell portions of the roller. Each roller may be fixed upon a shaft extending axially through the same, these shafts being indicated at 7 and 8. The shafts may be conveniently be non-circular in cross-section, preferably square, except at the ends which are cylindrical. In molding the rollers, or the heads, if the latter be made separately from the cylindrical portions, suitable eyelets 9 may be set in the centers of the heads for engagement with the supporting shafts. One of the shafts is extended at one end for driving purposes. In the arrangement shown, the shaft of the upper roller is carried through one side of the head into a motor casing 10, for direct connection with the rotating element of a suitable motor, such, for example, as an electric motor or a fluid-driven turbine. Only one of the rollers needs be positively driven, as it will drive the other roller through frictional engagement therewith.

If desired, means may be provided for producing a small internal pressure in the rollers. Thus, in Fig. 5, there is a roller 11 whose shaft 12 has therein a passage 13 extending from one end to an outlet point at the periphery of the shaft within the chamber of the roller. To the inlet end of the passage is connected an ordinary tire valve 14 through which air may be introduced.

The rollers are longer than the width of the opening or window 2, so that the bearings for the shafts are outside of the zone through which the cotton travels into and through the head. The front wall of the head, at opposite sides of the opening 2, is preferably bent inwardly just opposite the line of contact between the rollers, in the form of triangular lips 15. These lips form end walls for the space just in front of the lower portion of the upper roller and the upper portion of the lower roller, and prevent cotton or other material from being accidentally drawn around the ends of the rollers.

The head or casing may be provided with air inlet openings 16 somewhat in rear of the rollers; whereby, when the conduit is connected to a suction device, air is drawn through the opening 16 and rearwardly through the tubular neck of the picker head. In operation, the rollers rotate at high speed and throw the cotton rearwardly into the neck to a point considerably beyond the openings 16. Therefore the cotton is positively delivered to the rearwardly flowing stream of air and is carried by the latter through the conduit.

On account of the flexible character of the rollers, they offer very little resistance to rotation, even at a time when seeds are passing between the same. Therefore it is unnecessary to provide speed reducing gearing between the motor and the rollers to produce increased power; and one of the rollers may be connected directly to the motor shaft. The construction of the mechanism is consequently reduced to its simplest form; and my improved picker head may be operated successfully by ignorant persons and without requiring the constant presence of a skilled mechanic.

While I have illustrated and described with particularity only a single preferred form of my invention, with a single modification, I do not desire to be limited to the exact structural details thus illustrated and described; but intend to cover all forms and arrangements which come within the definitions of my invention constituting the appended claims.

I claim:—

1. A picking element for a cotton picker head comprising a hollow cylindrical roller of soft rubber, and heads of yieldable rubber closing the ends of the roller.

2. A picking element for a cotton picker head comprising a hollow cylindrical roller of rubber stiff enough to keep its shape when free from pressure and soft enough to yield under slight pressure, heads of yieldable rubber closing the ends of the roller, and a supporting shaft extending longitudinally through the roller and out of contact with the cylindrical wall thereof.

3. A picking element for a cotton picker head comprising a hollow air tight cylindrical soft rubber roller, and means for introducing fluid into the interior of the roller.

4. A cotton picker head comprising a casing open at one side, two parallel contacting rollers extending across the casing opposite the opening, said rollers being formed of soft rubber, and means for rapidly revolving at least one of said rollers.

5. A cotton picker head comprising a casing open at one side, two parallel contacting rollers extending across the casing opposite and in the vicinity of said opening, said rollers being in the form of hollow cylinders made of soft rubber, and means for rapidly revolving at least one of said rollers.

6. A cotton picker head comprising a casing having an opening in one side, two parallel contacting rollers extending across the casing opposite and in the vicinity of said opening, said rollers extending beyond the opening at the ends of the rollers, the rollers being made of soft rubber that will yield to permit the seed contained in the cotton to pass between the same, and means for rapidly revolving at least one of said rollers.

7. A cotton picker head comprising a casing having an opening in one side, two parallel contacting rollers extending across the casing opposite and in the vicinity of said opening, said rollers extending beyond the opening at the ends of the rollers, the rollers being made of soft rubber that will yield to permit the seed contained in the cotton to pass between the same, means for rapidly revolving at least one of said rollers, the wall of the casing at the sides of said opening extending partly into said opening along a longitudinal plane containing the line of contact between said rollers.

8. A picking element for a cotton picker head comprising a hollow cylindrical roller of rubber stiff enough to keep its shape when free from pressure and soft enough to yield under slight pressure, a shaft extending through the roller at the long axis of the latter, and means for yieldingly supporting the cylinder upon the shaft.

9. A cotton picker head comprising a casing open at one side, two parallel shafts extending across the casing one above the other behind said opening, a hollow cylinder of soft rubber surrounding each shaft and in frictional engagement with the other cylinder, the internal diameter of each cylinder being considerably greater than the diameter of the corresponding shaft, means for yieldingly supporting each cylinder on its shaft, and means for rotating at least one of the shafts.

In testimony whereof, I sign this specification.

JAMES H. COOPER.